US012779336B2

(12) United States Patent
Polti et al.

(10) Patent No.: US 12,779,336 B2
(45) Date of Patent: Nov. 3, 2026

(54) METHOD AND SYSTEM FOR AUTOMATING THE GENERATION OF GAME ASSETS

(71) Applicant: BEAR FIGHT GAMES LLC, Tampa, FL (US)

(72) Inventors: Fernando A. Polti, Las Vegas, NV (US); Seth Young, Arvada, CO (US); Seth Schorr, Las Vegas, NV (US)

(73) Assignee: Bear Fight Games LLC, Tampa, FL (US)

( * ) Notice: Subject to any disclaimer, the term of this patent is extended or adjusted under 35 U.S.C. 154(b) by 40 days.

(21) Appl. No.: 18/390,493

(22) Filed: Dec. 20, 2023

(65) Prior Publication Data

US 2025/0205604 A1 Jun. 26, 2025

(51) Int. Cl.

| | |
|---|---|
| ***A63F 13/60*** | (2014.01) |
| ***G06F 40/289*** | (2020.01) |
| ***G06T 3/4053*** | (2024.01) |
| ***G06T 11/00*** | (2006.01) |

(52) U.S. Cl.

CPC ............ *A63F 13/60* (2014.09); *G06F 40/289* (2020.01); *G06T 3/4053* (2013.01); *G06T 11/00* (2013.01)

(58) Field of Classification Search

None

See application file for complete search history.

(56) References Cited

U.S. PATENT DOCUMENTS

| | | | | |
|---|---|---|---|---|
| 10,937,066 | B2 * | 3/2021 | Morishita | G06Q 30/0267 |
| 12,316,720 | B1 * | 5/2025 | Smith | H04L 67/63 |
| 2007/0232381 | A1 * | 10/2007 | Sato | G07F 17/34 463/20 |
| 2009/0075721 | A1 * | 3/2009 | Pacey | G07F 17/3211 463/20 |
| 2020/0384356 | A1 * | 12/2020 | Abdelkarim | A63F 13/92 |
| 2022/0101053 | A1 * | 3/2022 | Litvak | G06V 10/774 |
| 2024/0037810 | A1 * | 2/2024 | Gong | G06F 40/30 |
| 2024/0193821 | A1 * | 6/2024 | Denison | G06F 40/40 |
| 2024/0226734 | A1 * | 7/2024 | Benedetto | A63F 13/77 |
| 2024/0320867 | A1 * | 9/2024 | Bean | G06T 11/00 |
| 2024/0378970 | A1 * | 11/2024 | Colvin | G06N 20/00 |
| 2024/0386621 | A1 * | 11/2024 | Zhang | G06V 10/761 |
| 2025/0029206 | A1 * | 1/2025 | Ranzinger | G06V 10/82 |
| 2025/0166236 | A1 * | 5/2025 | Azarian Yazdi | G06T 11/00 |

* cited by examiner

*Primary Examiner* — Joni Hsu

(74) *Attorney, Agent, or Firm* — Snell & Wilmer LLP

(57) ABSTRACT

An intelligent system for generating game assets implements a model-driven game image generation tool which receives input regarding game image characteristics, such as text indicating one or more attributes for a desired game asset image, encodes the text into a numerical representation processable by a game asset generator model which uses stored knowledge of a trained model to transform the numerical representation into a generated image output. The stored knowledge of a trained model learned from processing of text-image pairs may be updated using feedback provided by a discriminator module and/or user feedback. Generated images may be associated with math models and provided to a gaming machine for presenting a wagering game.

20 Claims, 5 Drawing Sheets

FIG. 2A
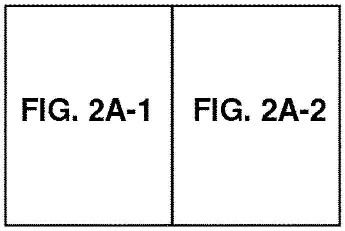
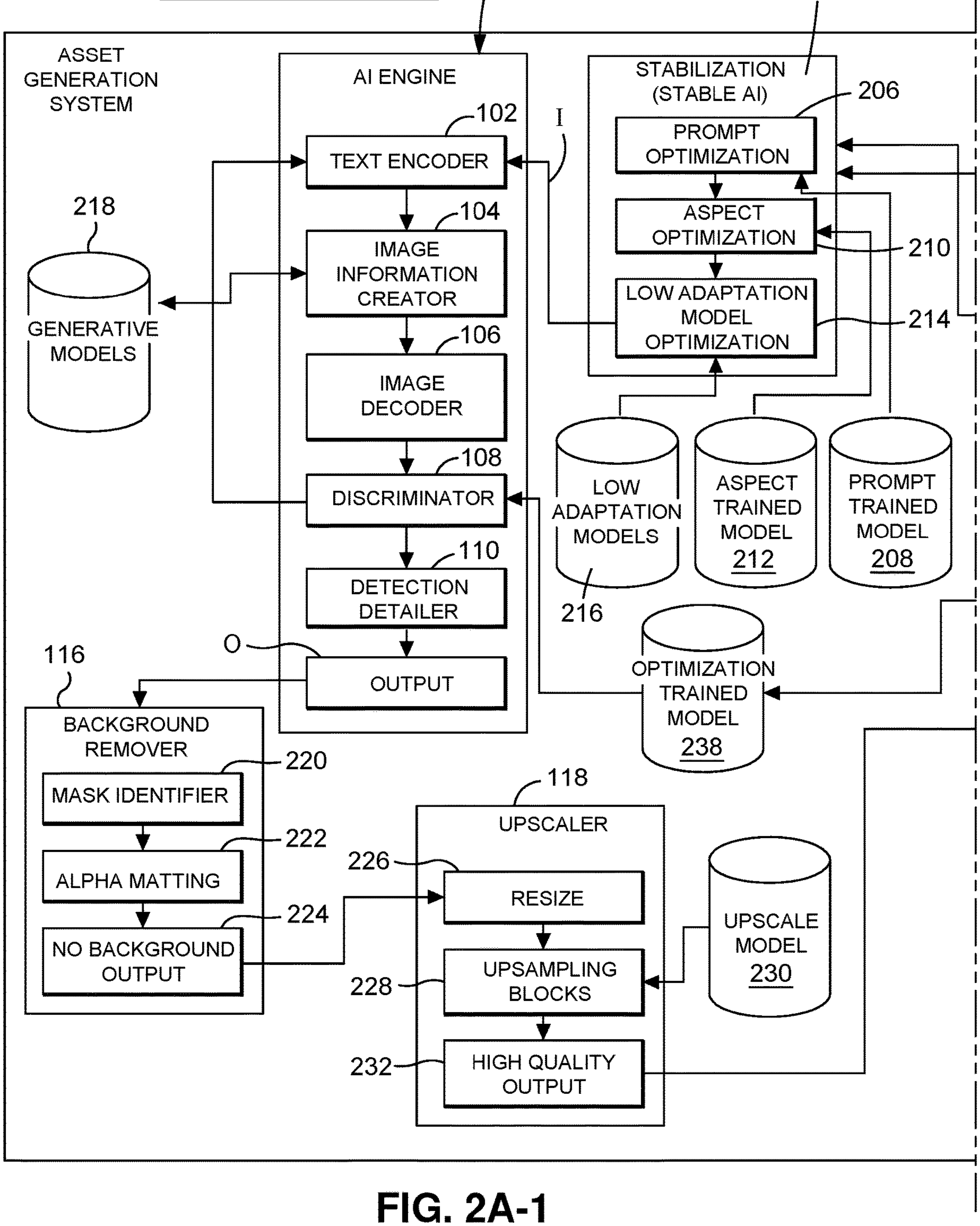
FIG. 2A-1

METHOD AND SYSTEM FOR AUTOMATING THE GENERATION OF GAME ASSETS

FIELD OF THE INVENTION

The present invention relates to methods of generating game assets, such as slot symbols or other content as may be used to present a wagering game.

BACKGROUND OF THE INVENTION

Originally, casino-style gaming machines such as slot machines included physical reels that were used to display game symbols. The game symbols were generally a variety of simple symbols which were printed on a strip of paper that was applied to a cylinder. When the cylinder or reel was rotated and stopped, one or more of the printed symbols would align with a viewing window. The outcome of the game was determined by the combination of symbols that appeared along a payline of the viewing windows that were associated with a number of aligned reels, such as 3 or 5 reels.

Later, electronic slot machines were developed which simulated traditional slot machines by graphically displaying a plurality of reels that rotate and then stop to display one or more symbols. Because the symbols are graphically displayed, they can comprise much more complex designs. Further, the same display which displays the slot symbols may also then be used to display associated game artwork to enhance the game play experience. These same principles and benefits then translate to 'online' gaming, where a game is presented on a computing device (such as a phone, laptop, tablet or home computer) of a player, such as linked to a game server.

A problem that exists with these graphics-based games is the time it takes to create game artwork and game symbols for each different game. In particular, while electronic slot machines and online slot game may all utilize the basic principle of graphically displaying reels and associated slot symbols in the play of the game, to make the games more interesting, they are often "themed." For example, a slot game might have a movie theme, such as "Jurassic Park", in which the game symbols comprise elements of the movie (dinosaurs of different varieties, different movie characters, etc.) and where the game artwork may mirror images from the movie. A player of such a game is provided with a visual representation which closely associates them with the movie and makes the game more interesting to view and play.

However, the process for creating the artwork and game symbols is generally very time consuming. Further, the development process, which generally involves one or more graphic designers using graphics tools to custom-create the artwork and symbols, must be repeated for each new game. Because of the time and effort this takes, the number of different games that can be created is limited and is expensive.

Further, the underlying game mechanics may differ from game to game. For example, games may have different potential combinations of symbols, and different sets of those symbols may be designated as winning or losing, with winning symbol combinations being assigned different winning amounts. The time and cost associated with creating a new game thus requires association of the generated artwork (particularly the symbols) with the underlying game mechanic.

An improved system and method for generating one or more game assets, such as the game graphical elements and association those assets with the game mechanic elements, is desired.

SUMMARY OF THE INVENTION

Embodiments of the invention comprise an automated, intelligent system and method to streamline the generation of game assets, such as game images. In one embodiment, the system and method are model-driven, such as using artificial intelligence ("AI") and other technology. Specifically, the automated system may create and optimize game assets, such as game symbol images, using predictive formulation.

In one embodiment, the model-driven game asset generation system comprises a generator component and a discriminator component, the generator component configured to generate one or more proposed game assets based upon one or more user inputs, and preferably one or more images based upon text inputs from the user, and the discriminator configured to determine acceptability of the one or more proposed game assets.

In one embodiment, the model-driven game asset generation system further implements an optimization engine which is configured to receive information regarding the use of generated game assets and utilize that engagement information in modifying the modeling in relation to the generation of future game assets.

One embodiment of the invention comprises an intelligent system for generating at least one game image asset, comprising a data storage device, digital information stored in the data storage device, the digital information comprising a plurality of text-image pairs and a plurality of learned models trained using an machine learning algorithm that processes the text-image pairs, and a processing device, coupled to the data storage device and configured to execute a model-driven game image generation tool, wherein the game image generation tool is configured to receive input regarding one or more game image characteristics, the input comprising text indicating one or more attributes for a desired game asset image, encode the text into a numerical representation processable by a game asset generator model, and implement, using the stored digital information, the game asset generator model which transforms the numerical representation into a generated image output.

Another embodiment of the invention comprises a method of presenting a game at a gaming device comprising receiving, at a game asset generation device comprising a processor, a memory and machine-readable code stored in the memory and executable by the processor, player input regarding one or more game image characteristics, implementing, by the processing device a model-driven game image generation tool, wherein the game image generation tool is configured to receive the input regarding one or more game image characteristics and transform the input into a plurality of generated images, storing the plurality of generated images in a database; and transmitting the plurality of generated images to the gaming device having a video display, a processor, a memory, and machine-readable code stored in the memory and executable by the processor to present a wagering game by displaying game information via the video display, the game information comprising one or more of the plurality of generated images.

Further objects, features, and advantages of the present invention over the prior art will become apparent from the detailed description of the drawings which follows, when considered with the attached figures.

DESCRIPTION OF THE DRAWINGS

FIGS. 2A1 and 2A2 illustrate a game asset generation system of the invention;

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

The present invention is an automated, intelligent system and method to streamline the generation of game assets, such as game images. In one embodiment, the system and method are model-driven, such as using artificial intelligence ("AI") and other technology. Specifically, the automated system may create and optimize game assets, such as game symbol images, using predictive formulation, where the predictive formulation may be provided by a trained, or learned, AI model trained using an advanced machine learning algorithm to create game assets. Such game assets might be used in relation to casino gaming machines, online wagering games, and/or associated marketing, etc.

Aspects of the method and system of the invention permit the automated creation of game assets for game designers, such as for implementation relative to casino and online game machines. The system and method permit the game designers to produce the game assets in less time and at less expense than traditional methods, thus allowing the game designers to roll out a greater number of different games. In addition, the method and system of the invention permits other users, such as individual game players, to create game assets. These game assets may be custom-created by and for the player, thus enabling the creation of "player-specific" games at little cost to a game provider. These and other advantages of the invention are described in more detail below.

Figure 1:
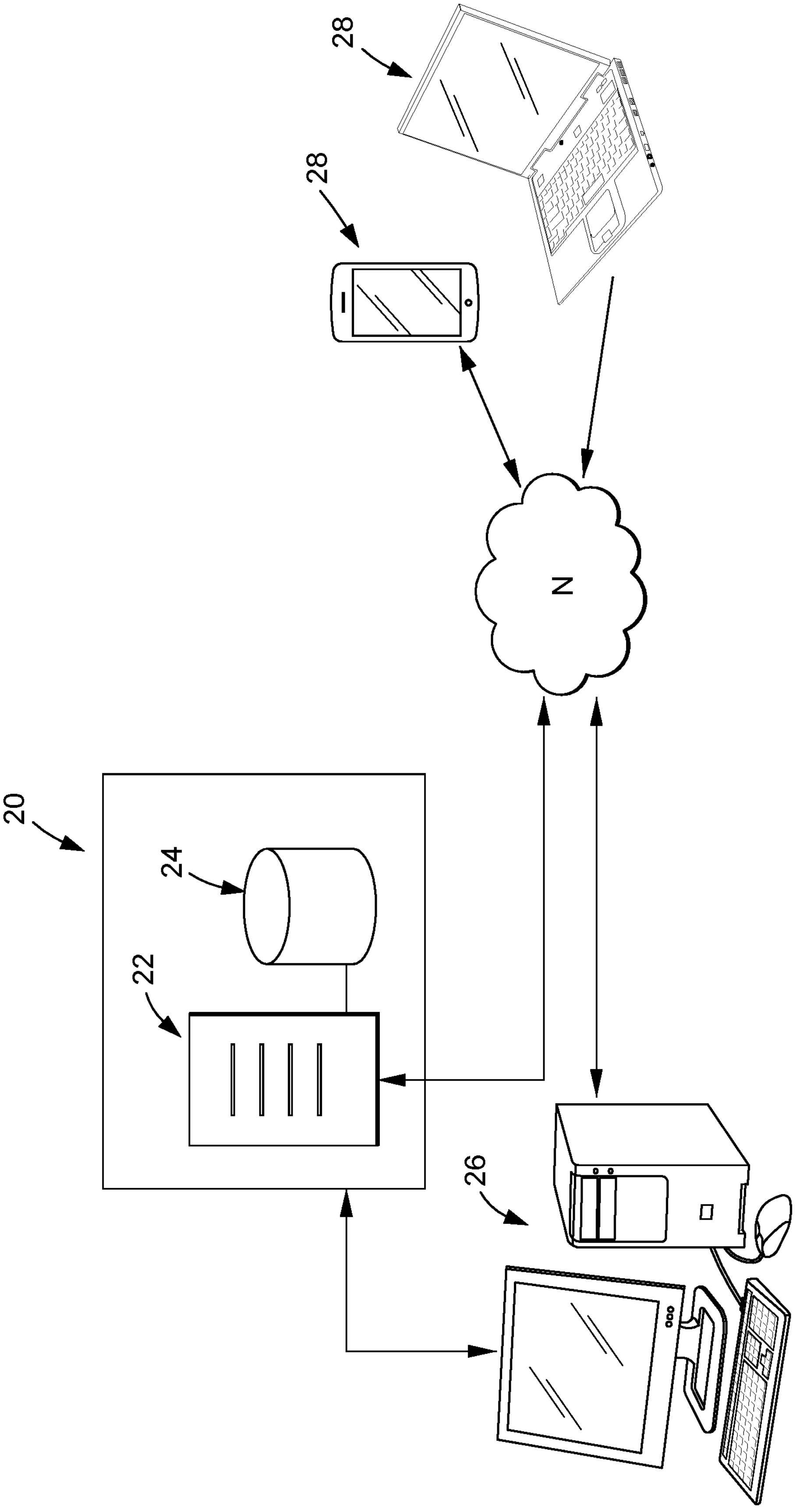
FIG. 1 illustrates an example environment of a game asset generation system of the invention.

FIG. 1 illustrates one environment of the invention, which includes an automated game asset generation system 20. The automated game asset generation system 20 may include at least one server 22 which comprises one or more processors or controllers, at least one communication device or interface, a database or other data storage device 24, and one or more additional memory or data storage devices (such as separate from the database). In one or more embodiments, the processor(s) is configured to execute one or more instructions, such as in the form of machine readable code (i.e. "software"), to allow the server 22 to perform various functions. The software is preferably non-transitory, such as by being fixed in a tangible medium. For example, the software may be stored in the one or more memory devices. One or more of the memory devices may be read-only. In addition, the software may be stored on a removable medium in some embodiments. In general, the one or more memory devices are used as temporary storage. For example, the one or more memory devices may be random access memory or cache memory used to temporarily store some user information and/or instructions for execution by the at least one processor.

The software may comprise one or more modules or blocks of machine-readable code. Each module may be configured to implement particular functionality when executed by the one or more processors, and the various modules may work together to provide overall integrated functionality. Of course, in certain embodiments, it is also possible for various of the functionality to be implemented as hardware, i.e. a processor or chip which is particularly designed to implement various of the functionality described herein.

In one embodiment, the server 22 may include (or be linked communicatively at one or more times to) one or more input and/or output devices, such as a keyboard, mouse, touchscreen, video display or the like, whereby the processor may receive information from an operator or servicer of the server 22 and/or output information thereto. This allows, for example, an operator of the server 22 to interface with the server 22 to upgrade, maintain, monitor, etc., as well as receive requests to generate content and perform other functions as described herein. Such input/output devices may comprise, for example, a workstation 26, or other user devices 28, such as personal computers (laptop/desktop computers), mobile communication devices (phones, PDAs, tablets) or other devices. These devices may communicate with the server 22 via one or more communication links, which links may be wireless (e.g. cellular, Wi-Fi, Bluetooth, etc.) or wired, and may include various networks N (the Internet, cellular networks, LANs, WANs, etc.).

In one embodiment, the processor and other elements of the server 22 may be linked and thus communicate over one or more communication buses. In this manner, for example, the processor may read/receive software from the memory for execution, receive inputs and provide outputs to the various I/O devices, receive information from or output information to external devices via the communication interface, etc. The one or more communication devices or interfaces permit the server 22 to communicate with the one or more workstation 26 and preferably external devices, networks, systems and the like, such as the user devices 28.

Figures 2, 2A:
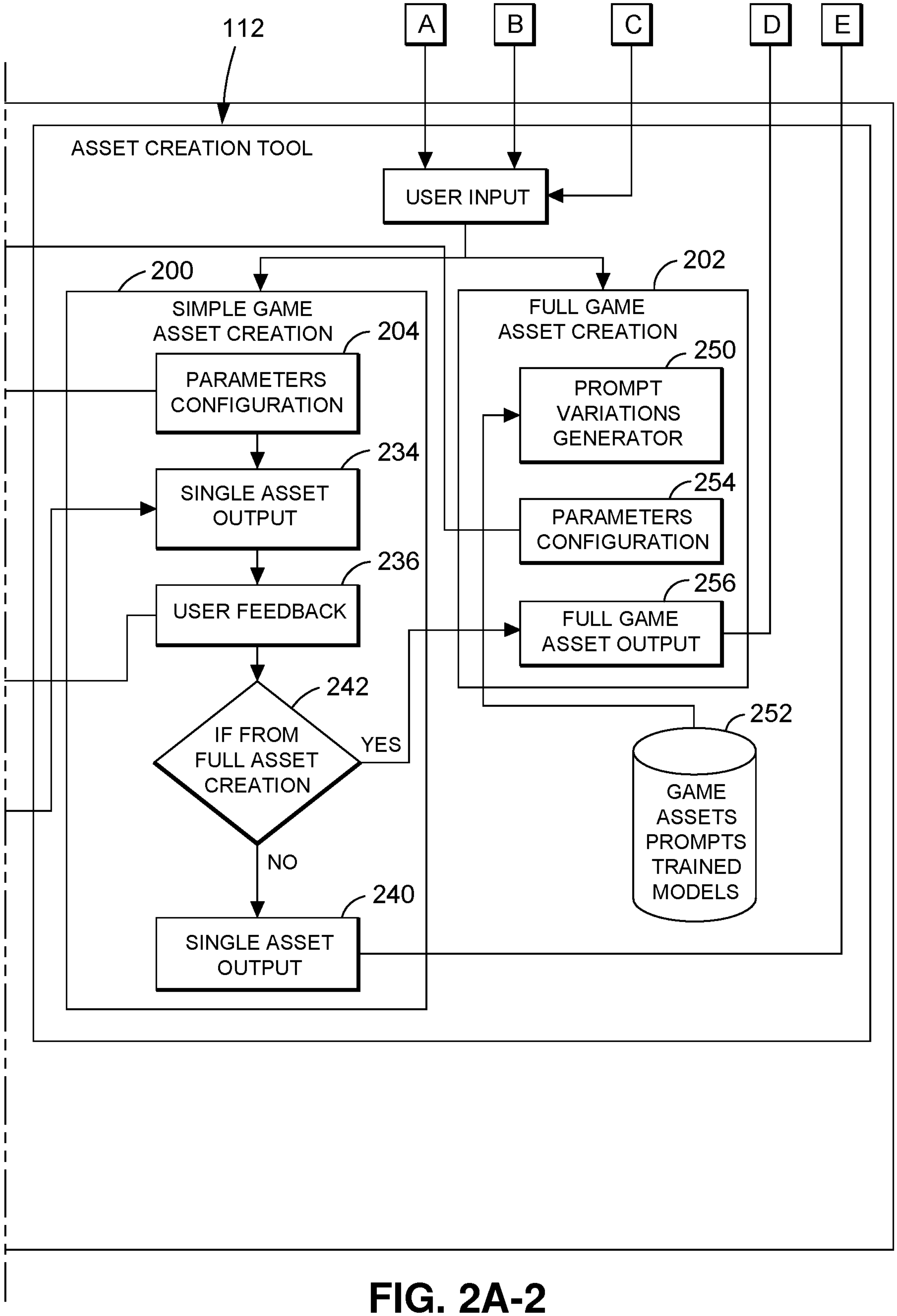

Referring to FIGS. 2A-1 to 2A-2, in one embodiment, the automated game asset generation system 20 comprises an AI engine 100 which implements a model-driven game asset generation tool. The AI engine 100 might be implemented as software running on the server 22, or might be implemented relative to or interfacing with, a remote engine, such as a third party AI engine (such as, but not limited to OpenAI, Google AI, IBM Watson, ChatGPT, Midjourney, etc.). In such a configuration, the controller of the server 22 may communicate with the remotely implemented AI engine, such as through one or more networks.

In one embodiment, the AI engine 100 includes/implements, or works with, one or more modules. As shown in FIGS. 2A-1 to 2A-2, these modules may include a text encoder 102, an image information creator or generator 104, an image decoder 106, a discriminator 108, and a detector detailer 110. In general, as detailed below, an input I is provided to the AI engine 100, such as to the text encoder 102, which results in the generation of an output O. As described below, in a preferred configuration, the input I comprise information in text/instruction format, while the output O comprise information which represents one or more generated images.

In one embodiment, the system 20 is configured to generate game assets based upon one or more user inputs, such as provided relative to an asset creation tool 112 such as that shown in FIG. 2A-2. Such a tool 112 might be implemented by the server 22 or via a workstation 26 or user device 28, such as in the form of software executed by a controller or processor thereof (in the case where the server 22 implements the asset creation tool 112, a graphical user interface may be displayed on the workstation 26 or user devices 28 to convey information to the user).

As illustrated in FIGS. 2A1-2, an output of the asset creation tool 112 may be provided to a stabilization engine or stabilizer 114. The stabilizer 114 may generate the input I which is provided to the AI engine 100.

As further illustrated in FIGS. 2A-11 to 2A-2, the output O of the AI generator 100 may be routed to one or more enhancement engines or content modifiers, such as a background remover 116 and an upscaler 118.

Additional details of the invention will be appreciated from a further description of the system 22 in conjunction with FIGS. 2A1-2. In one configuration, one or more game assets are generated in response to user input. As described below, the user input may be in various forms. As indicated above, the user input may be provided to an asset creation tool 112 via input to a user device 28, workstation 26 or the like.

In one configuration, the system 20 may be configured to generate simple game assets or full game assets, or other variations of individual assets or sets of assets. As one example, a user might select an option to generate only simple game assets 200, which might comprise only a single or individual graphical image for a game. Such an image, for example, might comprise a symbol which is displayed in the play of a slot game (such as relative to physical or virtual slot reels, as are known in the art). As another example, the user might select an option to generate a complete set of game assets 202, which might comprise multiple game assets for the game, such as a plurality of game symbols (such as slot symbols and/or other artwork).

Figure 2B:
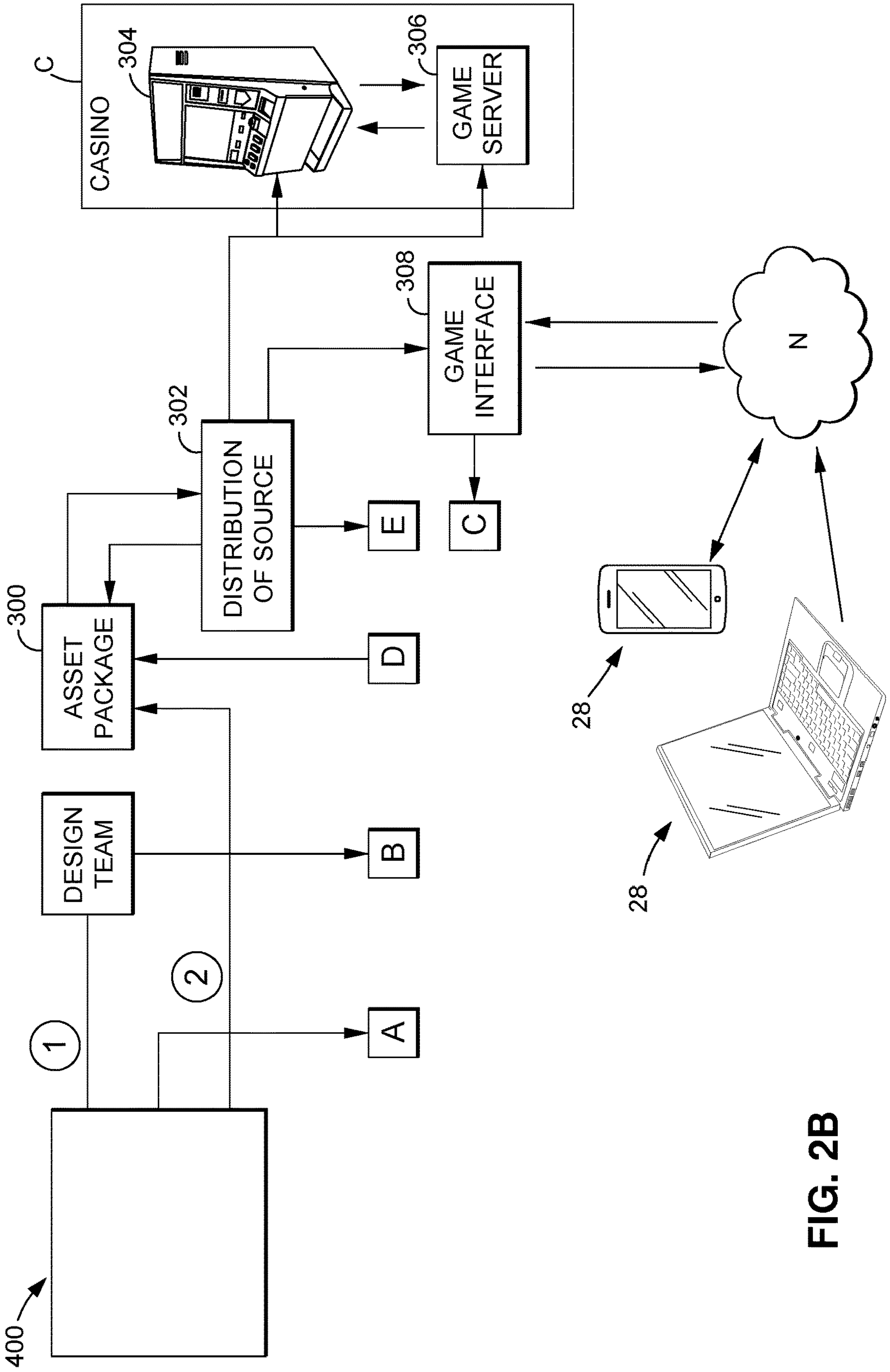
FIG. 2B illustrates elements which may interface with the game asset generation system illustrated in FIGS. 2A1-2 (wherein the letters A-E in those figures represent corresponding or linked features between the two figures)

In one configuration, user prompts are received by the asset generation tool 112. As illustrated in FIG. 2B, the user prompts might be provided by a game player, a game design team or the like. The prompts might include prompts prompting the user for the input of a set of one or more keywords, the selection of elements from a menu or list of available options, etc., that can be presented by a graphical user interface. For example, as described above relative to an on-line slot game player, the player might be permitted to provide input that can be used to customize their own slot machine-meaning that the player controls the generation of the game assets therefor so that a custom game is created for that player. In the case of a game design team, a game designer might utilize the system 20 to generate game assets for a new casino slot machine or online game which is presented to players, such as in the manner described below.

The user inputs may comprise various information. In a preferred configuration, the user inputs are descriptive terms or phrases. For example, the input might be "futuristic space mission to new galaxy." However, the inputs might comprise the entry or selection of particular themes, styles and the like. For example, relative to an input of "drag racing", the user might also select the themes or styles designating "old cars", "supercars", etc.

In one embodiment, the asset creation tool 112 utilizes the one or more user inputs to generate a parameters configuration 204. The parameters configuration 204 may comprise technical parameters for a game asset to be generated, which parameters are used by the AI engine 100 to generate the assets.

For example, relative to a game graphical interface, the parameters may include the size (Height×Width, such as in pixels) of the desired output asset and the number of steps involved in creating the asset. The number of steps may define the maximum number of calculations made to diffuse a generated image and achieve the final output. The parameter configurations may also set or determine the priority between the user input and the interpretation of the model (as detailed below). For instance, if a user input is for a game theme of "cat with a hat", a high priority will ensure the model always tries to interpret and incorporate both elements (a cat and a hat), even if its understanding of them is imperfect (e.g. even when the model does not fully understand the desired interrelationship of the two elements, such as where the input "cat and a hat" is likely intended to mean a cat wearing a hat, and not simply a cat and a hat). The parameter configuration 204 may also determine the sampling method used, which is a mathematical procedure that gradually removes noise from the initial random image.

The parameters configuration 204 may be output to the stabilization engine 114 before being provided to the AI engine 100. In one configuration, the stabilization engine 114 is configured to analyze and enhance the input to the AI engine 100 so that the output of the AI engine 100 is more consistent and accurate.

In one configuration, the stabilization engine 114 implements a prompt optimizer 206. This may comprise a process which enhances the original user input, such as if it is too simplistic or lacks enough detail to create a high-quality game asset. For example, if the user input is "cat with a hat", the optimized input or prompt might be "A cat with a hat on her head, in warm summer weather, realistically rendered in 8K, with an isometric perspective, digital painting, concept art, smooth texture, sharp focus, and illustrated in the style of Van Gogh."

As indicated, the prompt optimizer 206 may comprise or utilize a trained model 208. The trained model 208 may comprise, for example, a database of information (such as one or more learned models and data, including training data used to train the one or more models), or may itself comprise an AI-based model which is trained and is enabled to change over time based on feedback such as that from the prompt optimization module, or prompt optimizer, 206. The prompt optimizer 206 may, for example, analyze the user inputs using the prompt trained model 208 in order to determine if modifications thereto need to be made or not, and if so, what modifications. Overall, the prompt optimizer 206 ensures that the user input is comprehensive and detailed enough to generate high-quality game assets. It enhances the input by providing additional information, clarifying ambiguous terms, and refining the desired specifications of the assets. This optimization process increases the accuracy and effectiveness of the AI engine 100 in generating the desired game assets.

The stabilization engine 114 may also implement an aspect optimizer 210. The aspect optimizer 210 may be used to optimize the desired output asset size (in the graphical context, the Height×Width, such as in pixels). The aspect optimizer 210 may modify, for example, the output of the parameters configuration 204. As indicated, the parameters configuration 204 might provide basic asset size, but without context. The aspect optimizer 210 may utilize or implement an aspect trained model 212 to modify the asset size parameter. For example, the aspect optimizer 210 may determine the best aspect ratio based on the provided prompt. For instance, a character-focused prompt like "cat with a hat" may be analyzed to determine that the aspect of the generated graphical asset should have a primary vertical aspect (e.g. H>W). In contrast, a scene-oriented prompt like "Battlefield of the 2nd world War" may be analyzed to determine that the aspect of the generated graphical asset should have a primary horizontal aspect (e.g. W>H).

In addition, the stabilization engine 114 may implement a low adaptation optimizer 214. The low adaptation optimizer 214 may implement or utilize one or more low adaptation models 216. These models are designed to optimize the input to the AI engine 100 in a manner which allows the AI engine 100 to optimize the generated asset output with a lower processing cost. In one configuration, for example, the low adaptation optimizer 214 may associate new weight layers added on top of the main model. This adaptation aids the AI engine 100 in more efficiently generating new styles or concepts, and is an effective method for transitioning between different styles, concepts, structures, etc., at a low processing cost. The low adaptation optimizer 214 may analyze input prompts and select an appropriate low adaptation model from the available models 216. Each low adaptation model may be trained to specialize in a certain style, concept, structure, etc. For example, if the prompt is "painting in the style of Picasso", the low adaptation optimizer 214 may select a Picasso-style low adaptation model to guide the AI engine 100 in generating the asset. This allows for faster and more efficient generation of assets with specific characteristics, reducing the overall processing cost and improving the performance of the system. Additionally, the low adaptation optimizer 214 may dynamically adjust the weights of the new layers added to the main model based on the input prompt. This allows for seamless transitions between different styles or concepts, ensuring that the generated assets are consistent and coherent.

In one embodiment, an output of the stabilization engine 114 is the input I to the AI engine 100. As indicated, this input I might be first provided to a text encoder 102. The text encoder 102 preferably translates the input I to a modified input having a format that can be used by the AI engine 100 for use in creating the game assets. The text encoder 102 utilizes a variety of techniques to convert the input I into a suitable format for the AI engine 100. This includes preprocessing the text, removing unnecessary characters or symbols, and potentially tokenizing the text into smaller units such as words or phrases. Additionally, the text encoder may apply various language processing algorithms to enhance the semantic understanding of the input. Once the input I has been encoded by the text encoder 102, it is passed on to a game asset generator of the AI engine 100. The game asset generator of the AI engine 100 employs at least one model trained using an advanced machine learning algorithm and learned knowledge from a corpus of training data to analyze and interpret the modified input. This involves parsing the encoded text, extracting relevant information, and comprehending the underlying context and intent expressed within the input. Based on the analysis performed by the game asset generator of the AI engine 100, game assets are generated. These assets can include, but are not limited to, character designs, environments, dialogue scripts, and gameplay mechanics. The AI engine utilizes its learned knowledge from a corpus of training data to generate assets that align with the stylistic preferences and requirements specified for the game. Overall, the text encoder 102 and the game asset generator of the AI engine 100 work in tandem to transform the initial input I into game assets that are suitable for integration into the overall gaming experience. The collaborative effort between these components ensures that the generated assets are cohesive, visually appealing, and appropriate for the intended gameplay.

The text encoder 102 provides its output to a game asset generator. In one configuration, the game asset generator includes an image information creator 104. Here the AI engine 100 applies the modified input to one or more trained image generator models 218. The image generator model 218 utilizes advanced deep-learning techniques to generate the image output based on the text input provided by the text encoder 102. The image generator model 218 consists of multiple layers of neural networks that are trained on a large dataset of text-image pairs. The text input provided by stabilization engine 114 is first encoded by the text encoder 102, which converts the input into a numerical representation that the image generator model 218 can process. This encoding process captures the semantic meaning and context of the text. The encoded text is then fed into the image generator model 218, which uses a combination of convolutional neural networks (CNNs) and recurrent neural networks (RNNs) to transform the input into image information. The image generator model 218 leverages the data and knowledge learned during training to interpret the encoded text and generate the corresponding image output. The image generating model can be trained using a training dataset to extract, recognize and process syntactical patterns, semantic relationships, and visual associations.

The CNN components of the image generator model 218 learn to extract visual features and patterns from the text input, while the RNN components capture the sequential dependencies and generate image information progressively. The image generator model 218 uses the extracted visual features and the learned knowledge to determine the attributes, objects, and layout of the image. It utilizes various image generation techniques, such as deconvolution, upsampling, and attention mechanisms, to create a coherent and visually appealing representation of the input text. The generated image output is then passed through the image information creator 104, which further processes and refines the image to produce a final game asset. This may involve additional tasks such as style transfer, color correction, or adding special effects. Whereby the image information creator 104 generates information regarding a generated game asset, such as a game asset image. This generated asset information may be provided to image decoder 106, which translates that information to a particular image (such as to convert the encoded image (such as in a base64 stream) to an uncompressed bitmap).

Next, the initially generated output from the image decoder 106 may be provided to a discriminator 108. The discriminator 108 is preferably configured to analyze the initial output to determine if the output of the generator is valid/acceptable. In this regard, the discriminator 108 may use a model, such as optimization trained model 238, that is initially trained and then may be modified over time, such as based upon feedback provided thereto (such as via an operator of the system 20 who may view and provide input regarding the output before it is provided to the user who provided the input, or based upon feedback by the ultimate user of the system (such as a player who may indicate whether they like the results), etc.). The model 238 can be trained using an advanced machine learning algorithm and training data that may include real data, such as real images, as positive examples and fake data, which may include a number of images generated by image generator model 218, as negative training examples. In one embodiment, for example, the discriminator is trained to regenerate the model if the assertiveness/correlation of a generated asset falls outside of a tolerance range of the model (which itself is based upon previously trained data; e.g., whereby the model is continuously trained and modified).

Generated assets may be rejected by the discriminator 108 or may be accepted. In one configuration, if the generated game asset is rejected, the process can be repeated beginning with text encoder 102 using feedback from discriminator 108. In one configuration, if the generated game asset is accepted, it may be provided to a detection distiller 110. The detection distiller 110 may be used to mask or hide particular features of images, such as based upon instructions or a model. For example, the detection distiller 110 might be trained to detect persons, faces or other aspects of a generated image which preferably are not to be included in the image. These portions of the generated image may be masked, such as using an inpainting processes. The detection distiller 100 generate the output O of the AI engine 100. The output O may comprise a raw game asset in the form of a game asset image.

In one embodiment, this raw output O of the AI engine 100 may be modified or enhanced in various manners.

As indicated above, in one embodiment, the output O may be provided to a background remover 116 or other image modifier. In one embodiment, for example, the background remover 116 may implement a mask identifier 220. The mask identifier 220 may be used to identify particular portions of the generated image, such as the one or more objects in the image, from other portions of the image.

After masking of the generated image, the background remover 116 may implement alpha matting 222, via which the key objects (such as foreground objects) are extracted from the reminder of the background of the image. This preferably results in a "no background output" 224, which essentially comprises an unformatted or unsized game asset output.

In one embodiment, this unsized output may be provided to the upscaler 118 or other formatting engine for use in configuring the game asset output for a particular use. In one embodiment, this may comprise, for example, providing the unsized game asset output to a resizer. The resizer may resize the game asset image to a desired size. For example, in a particular slot game, the size may be defined by the pixel space for the symbol on the gaming machine's display.

The upscaler 118 may process the resized game asset image, such as by employing or utilizing one or more upscaler models 230 in order to implement upsampling blocks 228. The upsampling block may contain layers that increase the spatial resolution of the image to generate a high resolution image of the generated asset. The output of the upscaler 118 may thus generate a final game asset for use, where that asset comprises an image which is based upon the user input and which has been configured (configured with the desired resolution, size and orientation) for the desired use.

As illustrated in FIGS. 2A1-2, the single asset output 234 may be provided by high quality 118 in the form high quality output 232 to the asset creation tool 112, such as for display to the user. As indicated above, in one embodiment, the user may provide feedback 236 via the asset creation tool 112. This feedback may be used to update the trained model, such as optimization trained model 238, which is used by the discriminator 108 of the AI engine 100 in the manner described above.

In one embodiment, the user might reject the game asset (such as game asset image), in which case the system 20 might be configured to generate another image for review by the user. If the image is acceptable, the user only desires the generation of a single asset, then the generation process is complete and the asset may be output 240.

Referring still to FIGS. 2A1-2, as indicated above, a user might utilize the asset creation tool 112 to create or generate individual assets, or a group of assets, such as full game assets 202. In that case, the process is similar to that described above, except that the process is utilized to generate a succession of individual assets which are combined to form a set. For example, in this process, the user input may be again provided to a parameters configurator 254 for providing an input to the AI engine 100 (such as modified by the stabilizer 114). The full game asset generator tool may also include a variability engine 250 and associated database, such as for causing the AI engine 100 to generate a variety of different game assets (such as images) that relate to the user's input. For example, if the user's input is "spaceships", it is desired that the AI engine 100 generate a plurality of different images of spaceships—e.g., where there is variability as to each of the images. Once the system 20 has generated all of the individual assets, the full game asset 256 may be output.

As illustrated in FIG. 2B the output of the system 20 may be provided to various devices and/or systems and used in various manners. For example, an individual game asset 240 might be output for use as part of an asset package 300 (e.g., an individual game image asset might be combined with a sound asset, etc.)).

Figure 2C:
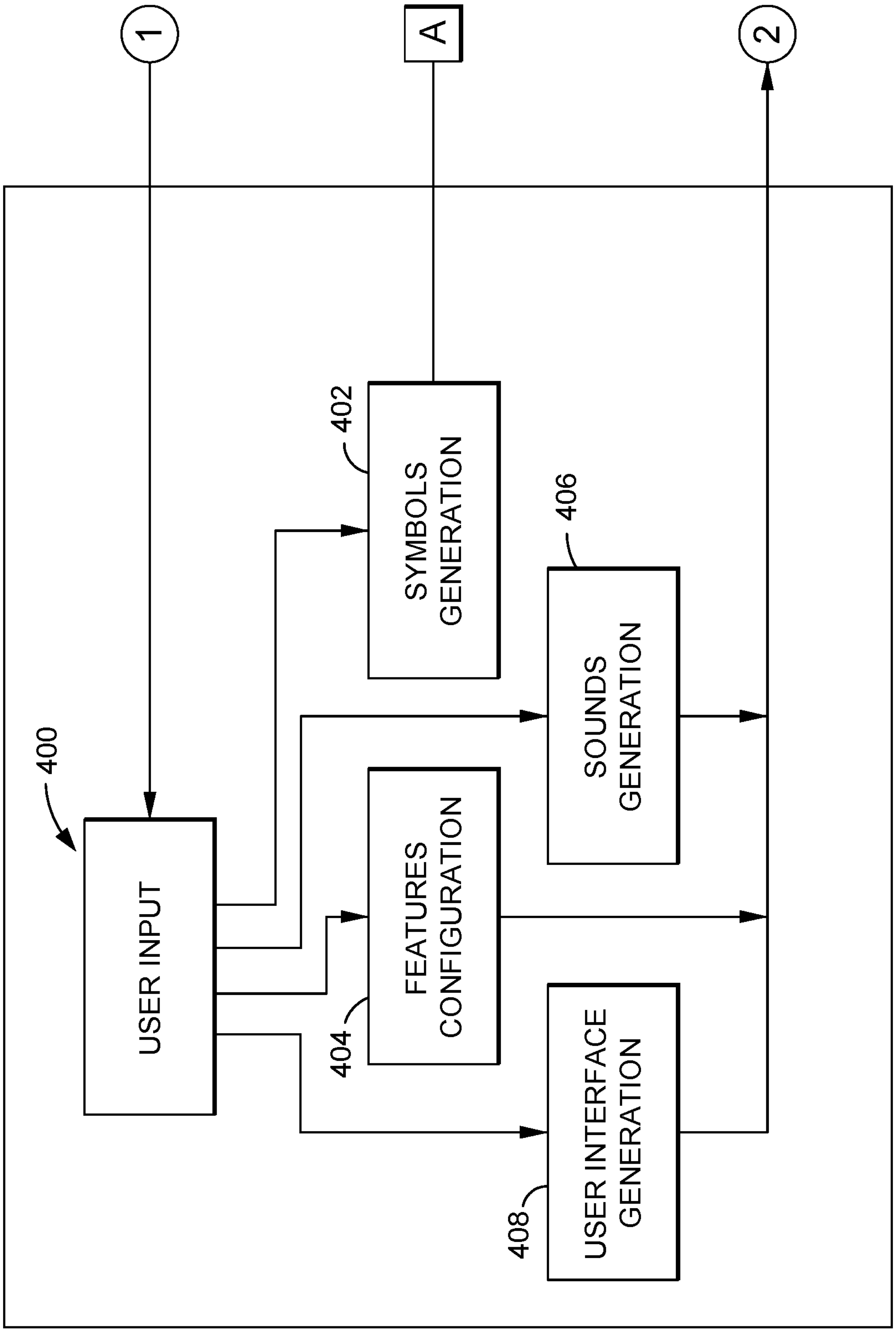
FIG. 2C illustrates aspects of user inputs to the game asset generation system of the invention.

For example, relative to FIG. 2C, a user—such as a player—may provide user input for the generation of one or more game assets. As described above, those inputs may relate to the creation of one or more game image assets, such as game symbols 402. However, the user input 410 might also provide inputs or selections relating to the design and development of game features 404, sounds 406, game interfaces 408 or other aspects of the game. Those inputs might be used, for example, to generate an entire game asset package which includes those features and the game image assets which are generated by the system 20 described herein.

Of course, while the system 20 has been described above with reference to the generation of game image assets, the system or a similar system might be used to generate other types of assets, such as game sound assets, etc.

An individual game asset, a package which includes the individual game asset and other assets (such as sound assets, etc.), or the full game assets might be used in various manners, including distributed for use in various manners, as at 302.

For example, the one or more generated game assets might be provided to a gaming machine 304, such as a physical gaming machine which may be placed on the floor of a casino C. As one example, a gaming machine manufacturer might install the one or more game assets into a memory of the gaming machine, such as for use by a controller thereof in presenting a game at the gaming machine, including by using the one or more game assets to display game information on a video display thereof.

Of course, in some examples, an existing gaming machine might be upgraded, such as by installing a new set of game assets into the memory. In some instances, casino gaming machines are "server based", in that they communicate with one or more game servers. In one example of the invention, the one or more generated game assets might be provided to a game server 306, such as via an interface between the system 20 and the game server 306 (which may include an API which facilitates communication of information therebetween). The game server 306 may then communicate those assets to the gaming machine 304. In some instances, the game assets might be downloaded to a memory of the gaming machine 304 to update the machine, and in others, such as where the gaming machine is configured as a thin client, game information might be generated by the game server 306 and be transmitted to the gaming machine 304 for display, which game information may include the game assets.

The one or more generated game assets might also be utilized in the presentation of online games. For example, the one or more game assets might be provided to a game interface 308, such as associated with an online game server. The game interface 308 may utilize the one or more game assets, for example, to present instances of games to users via their user devices 28.

As indicated above, in one configuration, one or more game assets may be custom generated for a player. In one embodiment, a player may save one or more game assets, such as for re-use. For example, a player might save generated game assets to a player loyalty account which is associated with a brick and mortar or online casino. The player may utilize their loyalty account information (such as player card and PIN) in order to access the saved game assets, such as for use in the future. In other examples, a player might save one or more game assets in relation to an alphanumeric code, QR code or the like, and may similarly access those one or more assets using the same code. For example, if the player wishes to save a set of game assets, the player might be presented with a QR code and instructed to take a picture of the code. The assets are then saved to that code. When the player desires to re-use those game assets, the player might display the QR code, such as on the display of their mobile device for reading by a gaming machine/system, and/or the player might also send that QR code to one or more friends who may use it to access the same set of stored assets.

For example, a player of an online casino might be provided with a displayed prompt such as: "would you like to create a custom slot game?" The player might then utilize the system and method of the invention to generate a set of "sci-fi" slot game symbols for the game. The player might also be permitted to save the generated assets. Once a set is generated, the player might be permitted to "Discard and Try Another Set" or "Save." If the set is saved, the player may utilize the saved set in the future. For example, upon logging in to the online casino site in the future, the player might be presented with the option to play existing games or play one or more games with the player's customized game assets.

As one aspect of the invention, use of generated assets is monitored by the system and that feedback information is provided to the AI engine for use in further training the engine. For example, if a player rejects one or more generated assets, that rejection may be used by the AI engine as feedback indicating that the results were not desirable and to move away from similar results. On the other hand, a player's saving of one or more game assets and/or frequent reuse of the asset(s) may be utilized by the AI engine as reinforcement for the generation of similar assets.

In one embodiment, a player might share game assets, such as by being able to send them to other players. Game assets might also be shared from machine to machine. For example, if a particular set of game assets is popular (based upon play metrics), those assets might be propagated to other machines.

It will be appreciated that the method and system of the invention may be utilized to generate assets for a variety of games. As indicated above, these games might comprise slot-type games. However, assets might be generated for other games, including but not limited to: table games, video poker, keno, bingo, lottery, horse racing, social casino, sweepstakes, scratchers, etc. The one or more game assets might also be generated for use in relation to an existing game, such as a bonus game for an existing game, or for modification of an existing game such as to include "wild", "stacked symbols" or similar features.

The method and system might also be utilized to generate assets for other game-related materials, such as casino marketing materials.

In one example, as indicated above, game assets may be linked to other game information, such as a game math model. For example, a game math model may include a table of game outcomes which may be randomly selected for display to a player, where that table is tied to particular odds of winning and losing outcomes, and thus a particular household. In accordance with the invention, generated game assets may be matched to the table of outcomes, e.g. particular combinations of the game assets (such as slot symbols) are linked to the table. In such a configuration, for example, the gaming machine's controller may utilize an RNG to randomly generate a number which is correlated to the table and results in the selection and display of a particular game outcome-including display of the symbols corresponding to that outcome.

Similarly, as indicated above, the generated game assets may be linked to generated audio for a game.

In one embodiment, user prompts may be typed into an input device. However, in other embodiments, user voice inputs may comprise the prompts.

In one example, the method and system may be configured to generate one or more custom game assets for particular applications, such as gaming machines having displays of particular configurations. For example, a game studio may wish to prepare one set of slot symbols for a casino gaming machine having a portrait 42" display, and another set of symbols for a bartop gaming machine having a 29" landscape display. As indicated above, in one embodiment, the asset generation system 20 may be configured to generate assets using information regarding image size and orientation. In some embodiments, this information may not be directly provided but may be generated. In other embodiments, the information may be provided by user input, causing the system to customize the output for the designated input.

Appendix A provides examples of user inputs and generated asset images in accordance with the invention.

It will be appreciated that this example of the invention may be combined with other features of the invention described herein. For example, this feature of the invention might be combined with the features described above for monetizing assets, whereby assets which are selected for use in generated ads may be tracked and the owner of the asset (such as an image) may be paid for use thereof.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. An intelligent system for generating a set of at least two casino game image assets for a slot-style casino game, comprising:

a data storage device;

digital information stored in said data storage device, said digital information comprising a plurality of text-image pairs and a casino game asset generator model trained using the plurality of text-image pairs; and a processing device, coupled to the data storage device, to execute a model-driven casino game image generation tool, wherein the casino game image generation tool is configured to:

(i) receive input from a user regarding one or more casino game image characteristics for one or more casino game symbols, said input comprising text indicating one or more attributes for a desired casino game image asset;

(ii) link designated parameters for said at least two casino game image assets to said input and implement a prompt optimizer to add details to said input to create a modified input;

(iii) encode said modified input into a numerical representation processable by said casino game asset generator model;

(iv) extract one or more visual features and patterns from said modified input by said casino game asset generator model to determine one or more attributes of said desired casino game image asset;

(v) use said casino game asset generator model to transform said numerical representation into a generated image output based on said one or more attributes;

(vi) process and refine the generated image output using an image information creator to generate asset information;

(vii) translate said generated asset information into one of said at least two casino game image assets;

(viii) repeat at least (v)-(vii) and implement a variability engine to create said set of at least two casino game image assets wherein each of said at least two game image assets is visually different from one another;

store, in a memory device, said set of at least two casino game image assets in association with an identifier linked to said user; and link, based upon input from said user of a selection of said stored set of at least two casino game image assets in relation to a designated slot-style casino game, said at least two game image assets to a game math model for said designated slot-style casino game in which said at least two casino game image assets are used as game symbols which are randomly selected for display on a gaming machine display and wherein designated combinations of game symbols are designated as winning game outcomes of said slot-style casino game.

2. The system of claim 1, wherein model-driven casino game image generation tool further comprises a discriminator component, said discriminator component configured to determine acceptability of said generated image output by determining whether or not the generated image output falls outside a defined tolerance range.

3. The system of claim 2, wherein said discriminator component is further configured to receive user input of the acceptability of said generated image output and said set of at least two casino game image assets comprise images which were accepted by said user.

4. The system of claim 1, wherein said processing device further implements an image decoder which receives said generated image output and converts said output to a particular image.

5. The system of claim 4, wherein said processing device further implements a background remover and said particular image is processed by said background remover to remove one or more background portions of the particular image.

6. The system of claim 4, wherein said processing device further implements an upscaler and said particular image is processed by said upscaler to resize said particular image.

7. The system of claim 1, wherein said step of linking comprises associating said at least two game image assets with a game symbol table for said slot-style casino game.

8. The system of claim 1, further comprising receiving selection of said designated slot-style casino game from said user.

9. The system of claim 1, wherein said learned casino game asset generator model is trained to recognize and process one or more of syntactical patterns, semantic relationships, and visual associations in accordance with one or more text-image pairs used in training said casino game asset generator model.

10. A method of presenting a slot-style casino wagering game at a gaming device comprising:

receiving, at a game asset generation device comprising a processor, a memory and machine-readable code stored in said memory and executable by said processor, player input regarding one or more game image characteristics;

implementing, by said processing device, a model-driven game image generation tool, wherein the game image generation tool is configured to:

(i) receive said input from a player regarding one or more game image characteristics;

(ii) link designated parameters for said at least two casino game image assets to said input and implement a prompt optimizer to add details to input to create a modified input;

(iii) encode said modified input into a numerical representation processable by said casino game asset generator model;

(iv) extract one or more visual features and patterns from said modified input by a learned game asset generator model to determine one or more attributes of said one or more game image characteristics;

(v) transform said numerical representation into a generated image using said learned game asset generator model;

(vi) process and refine the generated image using an image information creator to generate asset information; and (vii) translate said generated asset information to a game asset image;

(viii) repeat at least (v)-(vii), comparing the generated game image assets to create a set of at least two casino game image assets wherein each of said at least two game image assets is visually different from one another;

storing said set of at least two casino game image assets in association with an account of said player in a database; and transmitting, based upon input of information by said player to said gaming device of information which designates said account of said player and a selection of said set of at least two casino game image assets stored in association therewith, said set of at least two casino game image assets for linking to a math model for said slot-style casino wagering game, said gaming device having a video display, a processor, a memory, and machine-readable code stored in said memory and executable by said processor to present said slot-style casino wagering game by displaying game information via said video display, said game information comprising one or more of said at least two casino game image assets and wherein in accordance with said math model, one or more combinations of said at least two casino game image assets are designated as winning outcomes of said slot-style casino wagering game.

11. The method of claim 10, wherein said step of comparing comprises implementing a variability engine to eliminate images which are not visually distinguishable.

12. The method of claim 10, wherein said input comprises text indicating one or more attributes for said game image asset.

13. The method of claim 10, wherein said player input is provided to a computing device separate from said gaming device.

14. The method of claim 10, wherein said plurality of particular images comprise one or more slot game images.

15. The method of claim 10, wherein said processing device is configured to receive player input regarding acceptability of said plurality of particular images and to modify said model-driven generation tool based thereon.

16. The method of claim 10, wherein said game asset generator model utilized by said model-driven generation tool is trained using a machine learning algorithm and a plurality of text-image pairs to transform said input into said plurality of particular images.

17. The method of claim 10, wherein said processing device is further configured to link said plurality of particular images to a math model for said game, wherein said math model includes a table of game outcomes which are randomly selected for display to a player, wherein said table is tied to particular odds of winning and losing outcomes and a particular household, wherein said plurality of particular images are matched to said table.

18. The method of claim 10, wherein said input regarding one or more game image characteristics comprises one or more descriptive terms or phrases.

19. The method of claim 18, wherein said processing device is further configured to utilize information regarding a configuration of said video display of said gaming device to generate said plurality of particular images.

20. An intelligent system for implementing a slot-style casino game which utilizes a player designated set of at least two casino game image assets which are generated based upon player input, comprising:

a data storage device;

digital information stored in said data storage device, said digital information comprising a plurality of text-image pairs and a casino game asset generator model trained using the plurality of text-image pairs; and a processing device, coupled to the data storage device, to execute a model-driven casino game image generation tool, wherein the casino game image generation tool is configured to:

(i) receive input from a player regarding one or more casino game image characteristics for one or more casino game symbols, said input comprising text indicating one or more attributes for a desired casino game image asset;

(ii) link designated parameters for said at least two casino game image assets to said input and implement a prompt optimizer to add details to said input to create a modified input;

(iii) encode said modified input into a numerical representation processable by said casino game asset generator model;

(iv) extract one or more visual features and patterns from said modified input by said casino game asset generator model to determine one or more attributes of said desired casino game image asset;

(v) use said casino game asset generator model to transform said numerical representation into a generated image output based on said one or more attributes;

(vi) process and refine the generated image output using an image information creator to generate asset information;

(vii) translate said generated asset information into one of said at least two casino game image assets;

(viii) receive player input to accept or reject of said one of said at least two game image assets, wherein when said input is to accept said one of said at least two game image assets, said one of said at least two game image assets is associated with said set of at least two game image assets;

(ix) repeat at least (v)-(viii) and implement a variability engine to create said set of at least two casino game image assets wherein each of said at least two game image assets is visually different from one another;

(x) apply a background remover to remove one or more background portions of one or more casino game image assets of said set of at least two casino game image assets and to apply an upscaler to resize, for use in said designated slot-style casino game, one or more casino game image assets of said set of at least two casino game image assets;

(xi) store, in a memory device, said set of at least two casino game image assets in association with an identifier linked to said player;

(xii) repeat step (xi) to store at least two different sets of at least two casino game image assets in association with said identifier linked to said player;

receive input from said player of a selection of one of said stored sets of at least two casino game image assets in relation to a slot-style casino game designated by said player;

link said selected set of at least two casino game image assets to said player designated slot-style casino game whereby said at least two casino game image assets are used as game symbols which are randomly selected for display on a gaming machine display and wherein designated combinations of game symbols are designated as winning game outcomes of said slot-style casino game.

* * * * *